United States Patent [19]

Esterowitz et al.

[11] Patent Number: 5,088,103
[45] Date of Patent: Feb. 11, 1992

[54] ROOM-TEMPERATURE, FLASHPUMPED, 2.09 MICRON SOLID STATE LASER

[75] Inventors: Leon Esterowitz, Springfield, Va.; Gregory J. Quarles, Bowie, Md.

[73] Assignee: The United States of America as represented by the Secretary of the Navy, Washington, D.C.

[21] Appl. No.: 516,943

[22] Filed: Apr. 30, 1990

[51] Int. Cl.$^5$ .................. H01S 3/14; H01S 3/13
[52] U.S. Cl. ........................ 372/68; 372/39; 372/41; 372/32; 372/70; 372/69
[58] Field of Search ............. 372/39, 41, 68, 70, 372/69, 32; 352/301.4 R

[56] References Cited

U.S. PATENT DOCUMENTS 4,701,928  10/1987  Fan et al. .................... 372/68

OTHER PUBLICATIONS

"A New Spectroscopic Scheme of an Active Medium for the . . . ", Antipenko et al., Opt. Spectrosc. (USSR), 60(1), Jan. 1986, pp. 95-97.
"Active Medium of Lasers Operating in the 2μ Spectra Range . . . ", Antipenko et al., Sov. J. Quantum Electron., 16(7) Jul. 1986, pp. 955-957.
"Lasing of Holmium Ions as a Result of the 5/7→5/8 Transition . . . ", Allet'ev et al., Sov. J. Quantum Electron., 16(7), Oct. 1986, pp. 1404-1405.
"High-Efficiency 2.09 μm Flashlamp-Pumped Laser", Quarles et al., Appl. Phys. Lett., 55(11) Sep. 11, 1989, pp. 1062-1064.
Fan et al., IEEE J. Quant. Electron., 24(6), Jun. 1988, pp. 924-933, "Spectroscopy and Diode Laser-Pumped Operation of . . . ".
Duczynski et al., Appl. Phys. Lett., 48(23), Jun. 88, "CW Double Cross Pumping of the 5/7-5/8 Transition . . . ", p. 1562.
Fan et al., Opt. Lett., 12(9), Sep. 1987, pp. 678-680, "Continuous-Wave Operation at 2.1 μm of a . . . ".
Lotem et al., IEEE J. Quant. Electron., 24(6) Jun. 1988, pp. 1193-1200, "A 2 μm Holium Laser".

*Primary Examiner*—Georgia Epps
*Attorney, Agent, or Firm*—Thomas E. McDonnell; George Jameson

[57] ABSTRACT

A room temperature solid state laser for producing a laser emission at a wavelength of substantially 2.09 microns is disclosed. In a preferred embodiment, the laser includes: a laser cavity defined by first and second reflective elements opposing each other on a common axis to form a path therebetween; a laser crystal disposed in the laser cavity, the laser crystal having a host material capable of accepting $Cr^{3+}$ sensitizer ions, $Tm^{3+}$ sensitizer ions and $Ho^{3+}$ activator ions; an amount of $Cr^{3+}$ sensitizer ions between about 0.3% and about 2% dispersed within the host material; an amount of $Tm^{3+}$ sensitzer ions between about 3% and about 12% dispersed within the host material; and an amount of $Ho^{3+}$ activator ions between about 0.1% and about 0.7% dispersed within the host material; and flashlamp and means for exciting the laser crystal to produce a laser emission at substantially 2.09 microns with a slope efficiency of at least 4%, and preferably of at least 5%.

14 Claims, 2 Drawing Sheets

ROOM-TEMPERATURE, FLASHPUMPED, 2.09 MICRON SOLID STATE LASER

CROSS-REFERENCE TO RELATED APPLICATION

This patent application is related to the co-pending U.S. patent application entitled "A Room-Temperature, Flashpumped, 2 Micron Solid State Laser with High Slope Efficiency", Ser. No. 07/455,031, filed Dec. 22, 1989, both of which applications being commonly assigned to the Government of the U.S.

BACKGROUND OF THE INVENTION

1. Field of the Invention

The present invention relates to lasers and particularly to a flashpumped solid state laser which operates at a wavelength of 2.09 microns at or near room temperature and with a high slope efficiency of at least 4%.

2. Description of the Prior Art

Development of room temperature solid state lasers in the two micron spectral range has received renewed attention recently because of potential applications in medicine and optical communications.

Demonstrations of laser action around 2.0 microns, using the $^5I_7-^5I_8$ transition of $Ho^{3+}$, as well as the $^3F_4-^3H_6$ transition of $Tm^{3+}$, appeared among the early reports on rare earth ion lasers. One difficulty with both of these 2.0 micron transitions is due to the fact that the terminal laser level is only separated from the ground state by a Stark splitting on the order of $10^2-10^3 cm^{-1}$. Thus, the early laser demonstrations were performed at cryogenic temperatures in order to reduce the Boltzmann population of the lower laser level.

Early work on room temperature, 2 micron, solid state lasers has been conducted on a combination using $Cr^{3+}$ and $Tm^{3+}$ as co-dopant sensitizers and $Ho^{3+}$ as a dopant activator. In such early work on this sensitizer/activator combination, a lasing or slope efficiency of 0.5% was reported, without optimization of the host material, ion concentration or design parameters of the external laser system that was used. Operation of such a laser with this low slope efficiency of 0.5% would produce an extremely low output laser power level under normal operating conditions. Such a resultant low output laser power level would limit such a laser a very low power applications. In order to achieve a reasonable amount of output laser power from such a laser, a large and expensive, associated input power supply would be necessary.

Subsequent efforts have been undertaken to optimize several of the material and system parameters in order to increase laser slope efficiency. Many of the recent studies on $Cr^{3+}$-sensitized 2 micron lasers have concentrated on the scandium gallium garnets, YSGG and GSGG, as host materials. One such study used the above-mentioned Cr:Tm:Ho: dopant system in a YSGG host material to demonstrate a slope efficiency of 3.1% in a single, flashlamp-pumped, room temperature, 2 micron laser. This choice of host crystal material appears to have been based primarily on the high efficiency of Cr:Nd lasers in the scandium gallium garnets. Superior laser performance of Cr:Nd:YSGG (or GSGG) is attributed mainly to higher $Cr^{3+}$ cross sections and higher Cr to Nd transfer efficiencies in those hosts in comparison with YAG. However, in order to achieve these high transfer efficiencies, the scandium gallium garnet laser materials were required to contain very high concentrations of $Cr^{3+}$.

Such prior art work failed to utilized optimum concentrations of dopants and the best host material for a Cr:Tm:Ho: laser. In addition, the prior art work failed to realize that, in order to select the best host material for a Cr:Tm:Ho laser, it is necessary to determine the Cr to Tm energy transfer efficiency as a function of host crystal and dopant concentration. Thus, there is a long-standing need for improving the slope efficiency of a garnet crystal laser operating at room temperatures by utilizing optimum concentrations of dopants in the host material of the garnet crystal laser.

OBJECTS OF THE INVENTION

Accordingly, one object of the invention is to provide an efficient, 2.09 micron solid state laser.

Another object of the invention is to provide a pumped, $Cr^{3+}$-, $Tm^{3+}$- and $Ho^{3+}$-doped solid state laser that develops a laser emission at a wavelength of substantially 2.09 microns.

Another object of the invention is to provide a flashlamp-pumped, solid state laser having a host material selected from the group of garnet host materials consisting of YAG, YAlO, YGG, YSAG, YSGG, GGG, GSAG, GSGG, LLGG, and mixtures thereof, and with the garnet host material being doped with an effective amount of $Cr^{3+}$ sensitizer ions, with an effective amount of $Tm^{3+}$ sensitizer ions and with an effective amount of $Ho^{3+}$ activator ions.

Another object of the invention is to provide an efficient 2.09 micron laser that operates at or near room temperature.

Another object of the invention is to efficiently generate a laser emission at a wavelength of substantially 2.09 microns at or near room temperature and with a slope efficiency of at least 4%, and preferrably of at least 5%.

A further object of the invention is to provide a pulsed, flashpumped YAG laser effectively doped with sufficient $Cr^{3+}$, $Tm^{3+}$ and $Ho^{3+}$ ions to produce laser emission pulses at a wavelength of substantially 2.09 microns with a slope efficiency of at least 4%, and preferrably of at least 5%.

SUMMARY OF THE INVENTION

These and other objects of the invention are achieved by providing a room-temperature solid state laser for producing a laser emission at a wavelength of substantially 2.09 microns with a slope efficiency of at least 4%, and preferably of at least 5%. The room-temperature solid state laser comprises: a laser cavity defined by first and second reflective elements opposing each other on a common axis to form a reflective path therebetween; a laser crystal disposed in the laser cavity, the laser crystal having a host material capable of accepting $Cr^{3+}$ sensitizer ions, $Tm^{3+}$ sensitizer ions and $Ho^{3+}$ activator ions, an amount of $Cr^{3+}$ sensitizer ions between about 0.3% and about 2% dispersed within the host material, an amount of $Tm^{3+}$ sensitizer ions between about 3% and about 12% dispersed within the host material, and an amount of $Ho^{3+}$ activator ions between about 0.1% to about 0.7% dispersed within the host material and flashlamp means for exciting the laser crystal to lase at substantially 2.09 microns; a predetermined one of the first and second reflective elements outputting the laser emission at substantially 2.09 microns with a slope efficiency of at least 4%, and preferrably of at least 5% when the laser crystal is excited by the flashlamp means.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
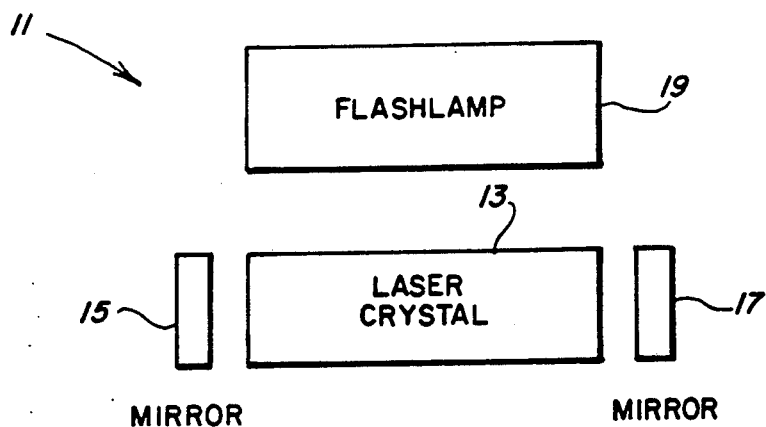
FIG. 1 illustrates a preferred embodiment of the invention.

Referring now to the drawings, FIG. 1 illustrates a chromium-, thulium- and holium-doped laser in accordance with the invention. Laser 11 is comprised of a laser rod or crystal 13 placed between a pair of aligned reflective elements or mirrors 15 and 17, or other cavity forming means, to form a resonator. Typically, as is well known in the art, one of the reflective elements 15 and 17 is substantially or totally reflective, while the other one of the reflective elements 15 and 17 is less reflective (or more transmissive) to the wavelength of the output laser emission. An excitation means, such as a flashlamp 19 is placed in close proximity to the laser rod 13 to pump the laser rod or crystal 13. The flashlamp 19 can be pulsed by means (not shown) to emit pulses of light at a pulse repetition frequency of, for example, one Hertz (1 Hz).

The laser crystal or rod 13 has a laser host material (not shown) which is selected from the broad group consisting of YAG (yttrium aluminum garnet), YAlO (yttrium aluminum oxygen), YGG (yttrium gallium garnet), YSAG (yttrium scandium aluminum garnet), YSGG (yttrium scandium gallium garnet), GGG (gadolinium gallium garnet), GSAG (gadolinium scandium aluminum garnet), GSGG (gadolinium scandium gallium garnet), and LLGG (lanthanum lutetium gallium garnet). As mentioned before, the host material could also be comprised of mixtures or combinations of this group of crystal materials. The preferred group of host materials is comprised of YAG, YSAG and YSGG, and the most preferred host material is YAG.

The selected host material of the laser crystal or rod 13 is doped with an amount of $Cr^{3+}$ (chromium) first sensitizer ions, with an amount of $Tm^{3+}$ (thumium) second sensitizer ions and with an amount of $Ho^{3+}$ (holmium) activator ions. The laser rod 13 can be pumped or excited by CW or pulsed light. When the laser rod 13 is pumped or excited by a light pulse from the flashlamp 19, the laser rod 13 develops an output pulse of laser emission (to be explained).

The chief characteristic or requirement of a selected host material is that it must have the capability of easily accepting a transition metal ion (such as $Cr^{3+}$ in this description) and lanthanide or trivalent rear earth ions (such as $Tm^{3+}$ and $Ho^{3+}$ in this description). The dopant $Cr^{3+}$, $Tm^{3+}$ and $Ho^{3+}$ ions must go into the host material without significantly distorting the lattice of the host material so that the quality of the host material remains high.

The $Cr^{3+}$ ions are the first sensitizer ions and their concentration is chosen so that there is good absorption into the host material of the excitation pump from the flashlamp 19. If the $Cr^{3+}$ concentration is too low, there will be poor coupling of the excitation from the flashlamp 19 into the host material. However, if the $Cr^{3+}$ concentration is too high, it will cause thermal lensing and other deleterious effects to the performance of the laser crystal 13. The term "amount of $Cr^{3+}$ sensitizer ions" means that the concentration of $Cr^{3+}$ ions in the host material is sufficient to cause close to a 100% absorption of the excitation from the flashlamp 19 into the host material, in addition to achieving uniform pumping throughout the laser host material. The optimum $Cr^{3+}$ concentration will vary with the dimensions of the host material of the laser crystal or rod 13. Since uniform absorption or pumping is desirable, a lower $Cr^{3+}$ concentration should be used for a larger diameter rod 13, while a higher $Cr^{3+}$ concentration should e employed for a smaller diameter rod 13.

The $Tm^{3+}$ ions are the second sensitizer ions which cause the energy to be efficiently passed from the $Cr^{3+}$ ions to the $Tm^{3+}$ ions. The $Tm^{3+}$ concentration must be high enough so that an efficient cross-relaxation process (to be explained) takes place. In addition, the $Tm^{3+}$ and $Cr^{3+}$ concentrations must be high enough so that an energy transfer between the $Cr^{3+}$ sensitizer ions and the $Tm^{3+}$ sensitizer ions is efficient. The term "amount of $Tm^{3+}$ sensitizer ions" means that the concentration of $Tm^{3+}$ ions in the host material is sufficient to enable a cross-relaxation process to be achieved with close to 100% effectiveness.

The $Ho^{3+}$ ions are the activator ions which cause the lasing from the laser crystal 13. The term "amount of $Ho^{3+}$ activator ions" means that the concentration of the $Ho^{3+}$ activator ions in the host material is sufficient to enable efficient lasing to take place from the $^5I_7$ to $^5I_8$ transition in the $Ho^{3+}$ activator ions in the laser crystal 13, without significant losses due to ground state absorption.

The host material can be selected from the above-listed broad group of crystals (YAG, YSGG, GSGG, GSAG, YSAG, YAlO, GGG, YGG and LLGG) and be doped with an amount of $Cr^{3+}$ ions between about 0.3% and about 2%, with an amount of $Tm^{3+}$ ions between about 3% and about 12%, and with an amount of $Ho^{3+}$ ions between about 0.1% and about 0.7% to produce a slope efficiency of at least 4%. Thus, when the amount or concentration of the $Cr^{3+}$ ions is selected to be between about 0.3% and about 2%, the associated $Tm^{3+}:Cr^{3+}$ ratio is between about 1.5:1 and about 40:1, while the associated $Tm^{3+}:Ho^{3+}$ ratio is between about 4.3:1 and about 120:1.

The host material is preferably selected from the preferred group of YAG, YSAG and YSGG crystals and is doped with a preferred amount of $Cr^{3+}$ ions between about 0.3% and about 1.3%, with a preferred amount of $Tm^{3+}$ ions between about 4.5% and about 7.5%, and with a preferred amount of $Ho^{3+}$ ions between about 0.25% and about 0.5% to produce a slope efficiency of at least 4%. Thus, when the amount or concentration of the $Cr^{3+}$ ions is preferrably selected to be between about 0.3% and about 1.3%, the associated $Tm^{3+}:Cr^{3+}$ ratio is between about 3.5:1 and about 25:1, while the associated $Tm^{3+}:Ho^{3+}$ ratio is between about 9:1 and about 30:1.

The host material is most preferably YAG and is doped with a most preferred amount of $Cr^{3+}$ ions between about 0.4% and about 0.9% (which is between about $3.8$ times $10^{19}$ cm$^{-3}$ to about $8.3$ times $10^{19}$ cm$^{-3}$), with a most preferred amount of $Tm^{3+}$ ions between about 5% and about 6% (which is between about $6.4$ times $10^{20}$ cm$^{-3}$ and about $8.3$ times $10^{20}$ cm$^{-3}$), and with a most preferred amount of $Ho^{3+}$ ions between about 0.25% and about 0.5% (which is between about $3.5$ times $10^{19}$ cm$^{-3}$ and about $7.0$ times $10^{19}$ cm$^{-3}$) to produce a slope efficiency of at least 5%. Thus, when the amount or concentration of the $Cr^{3+}$ ions is most preferrably selected to be between about 0.4% and about 0.9%, the associated $Tm^{3+}:Cr^{3+}$ ratio is between about 5.6:1 and about 15:1, while the associated $Tm^{3+}:Ho^{3+}$ ratio is between about 10:1 and about 24:1.

It should be noted at this time that, by the use of the percentage (%) ranges used in conjunction with the term "amount of $Cr^{3+}$ ions", it is meant the percent of substitution of the $Cr^{3+}$ ions for the aluminum ions in YAG, for the aluminum ions in YAlO, for the gallium ions in YGG, for the scandium and aluminum ion combination in YSAG, for the scandium and gallium ion combination in YSGG, for the gallium ions in GGG, for the scandium and aluminum ion combination in GSAG, for the scandium and gallium ion combination in GSGG, or for the lutetium and galium ion combination in LLGG. For example, an effective amount of $Cr^{3+}$ ions of 0.6% in a YAG host crystal material means that the $Cr^{3+}$ ions are substituted for (or replace) 0.6% of the aluminum ions in the YAG crystal.

Similarly, by the use of the percentage (%) ranges used in conjunction with the term "amount of $Tm^{3+}$ ions", it is meant the percent of substitution of the $Tm^{3+}$ ions for the yttrium ions in YAG, for the yttrium ions in YAlO, for the yttrium ions in YGG, for the yttrium ions in YSAG, for the yttrium ions in YSGG, for the gadolinium ions in GGG, for the gadolinium ions in GSAG, for the gadolinium ions in GSGG, or for the lanthanum ions in LLGG. For example, an amount of $Tm^{3+}$ ions of 6% in a YAG host crystal material means that the $Tm^{3+}$ ions are substituted for (or replace) 6% of the yttrium ions in the YAG crystal.

Finally, by the use of the percentage (%) ranges used in conjunction with the term "amount of $Ho^{3+}$ ions", it is meant the percent of substitution of the $Ho^{3+}$ ions for the yttrium ions in YAG, for the yttrium ions in YAlO, for the yttrium ions in YGG, for the yttrium ions in YSAG, for the yttrium ions in YSGG, for the gadolinium ions in GGG, for the gadolinium ions in GSAG, for the gadolinium ions in GSGG, or for the lanthanum ions in LLGG. For example, an effective amount of $Ho^{3+}$ ions of 0.36% in a YAG host crystal material means that the $Ho^{3+}$ ions are substituted for (ore replace) 0.36% of the yttrium ions in the YAG crystal.

It should be noted at this time that the selected host material is doped with the effective amount of $Cr^{3+}$ ions, with the effective amount of $Tm^{3+}$ ions, and with the effective amount of $Ho^{3+}$ ions by applying techniques well known to those skilled in the art and, hence, requires no further description of such tecniques.

In the operation of the laser 11 of FIG. 1, a light pulse from the pulsed flashlamp 19 enables the laser rod 13 to produce a laser line or wavelengths at 2.09 microns. As is well known to those skilled in the art, this laser line at 2.09 microns reflects back and forth between the reflective elements 15 and 17, with a portion of that laser line passing through the more transmissive one of the reflective elements 15 and 17 as the laser emission at 2.09 microns.

A more detailed description of the exemplary composition of the laser crystal or rod 13 and the operation of the laser rod 13, as well as the operation of the laser 11 of FIG. 1, will now be given by now referring to FIG. 2.

Figure 2:
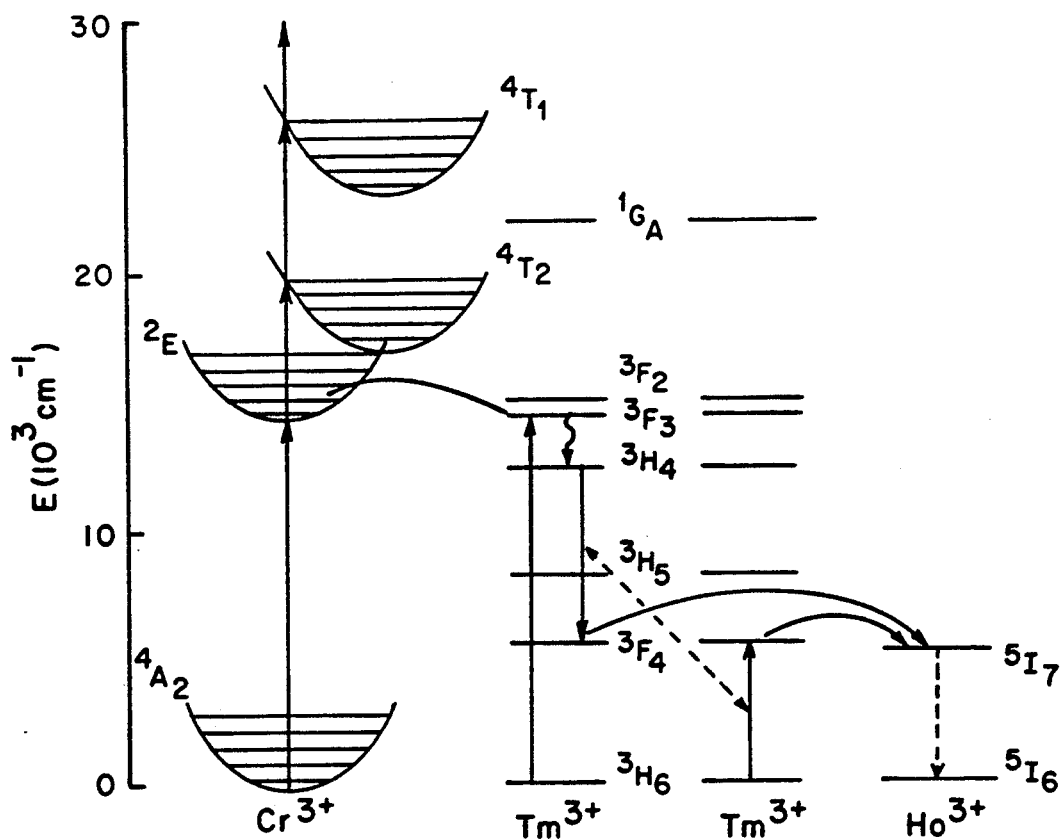
FIG. 2 illustrates a pumping diagram for the chromium-, thulium- and holmium- doped laser crystal of FIG. 1.

FIG. 2 illustrates the various energy levels of the chromium ($Cr^{3+}$), thulium ($Tm^{3+}$) and holmium ($Ho^{3+}$) - doped laser crystal or laser rod 13 of FIG. 1. More specifically, FIG. 2 is a diagram of the various energy levels for the $Cr^{3+}$, $Tm^{3+}$ and $Ho^{3+}$ ions in the laser rod 13, which can be comprised of an exemplary YAG host material. The importance of the $Cr^{3+}$ to $Tm^{3+}$ transfer efficiency to the 2.09 micron laser operation can be seen from the pumping scheme illustrated in FIG. 2.

In operation, each light pulse from the flashlamp is absorbed in the $^4T_1$ and $^4T_2$ bands of the $Cr^{3+}$ ions. After a nonradiative decay to and within the $^4T_2$ and $^2E$ levels or states of the $Cr^{3+}$ ions, the excitation is transferred from the $Cr^{3+}$ ions to the $^3F_3$ and $^3H_4$ states of the $Tm^{3+}$ ions by way of dipole-dipole interactions. Nonradiative decay of the $^3F_3$ level places virtually all of the excited $Tm^{3+}$ ions in the $^3H_4$ state. Each excited $Tm^{3+}$ ion then interacts with a ground-state $Tm^{3+}$ in a cross-relaxation process which gives rise to two $Tm^{3+}$ ions in the $^3F_4$ state. The energy in the $^3F_4$ state or level then transfers to the holmium ($Ho^{3+}$) $^5I_7$ level, which is the upper laser level. Lasing or photon emission then occurs at about 2.09 microns from the $^5I_7$ to $^5I_8$ laser transition in the $Ho^{3+}$ dopant.

Cross-relaxation is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level. The obvious advantage of this cross-relaxation process or operation is that a single $Tm^{3+}$ ion excited to the $^3H_4$ level generates two $Tm^{3+}$ ions in the $^3F_4$ level. Experiments have shown that the probability of the $Tm^{3+}$ cross-relaxation occurring is negligible for concentrations of $Tm^{3+}$ ions less than about 2%, but approaches unity for concentrations of $Tm^{3+}$ ions greater than about 5%.

A room temperature laser emission at substantially 2.09 microns was derived, as discussed in relation to FIGS. 1 and 2. In order to generate the laser wavelength at 2.09 microns, the composition of the laser rod 13 was selected to be favorable for all of the processes involved in flashlamp pumping at room temperature. As previously discussed in relation to FIG. 2, these processes were: absorption of the flashlamp light in the $^4T_1$ and $^4T_2$ bands of $Cr^{3+}$, nonradiative transfer of the excitation from the thermally mixed $^4T_2/^2E$ levels of $Cr^{3+}$ to the $^3F_3$ and $^3H_4$ levels of $Tm^{3+}$, and cross-relaxation among $Tm^{3+}$ ions to populate the $^3F_4$ level.

A laser rod 13 having a YAG ($Y_3Al_5O_{12}$) host material was selected. The YAG laser rod 13 was 5.0 mm in diameter and 76.3 mm in length. The rod ends were polished flat and parallel and had broad anti-reflection coatings centered at 2.0 microns. The laser cavity mirrors 15 and 17 of FIG. 1 are respectively disposed adjacent to the polished ends of the laser rod 13. The diffuse-reflecting pump cavity had a pumping length of 69 mm so that at least 91% of the rod length was pumped by the flashlamp.

Figure 3:
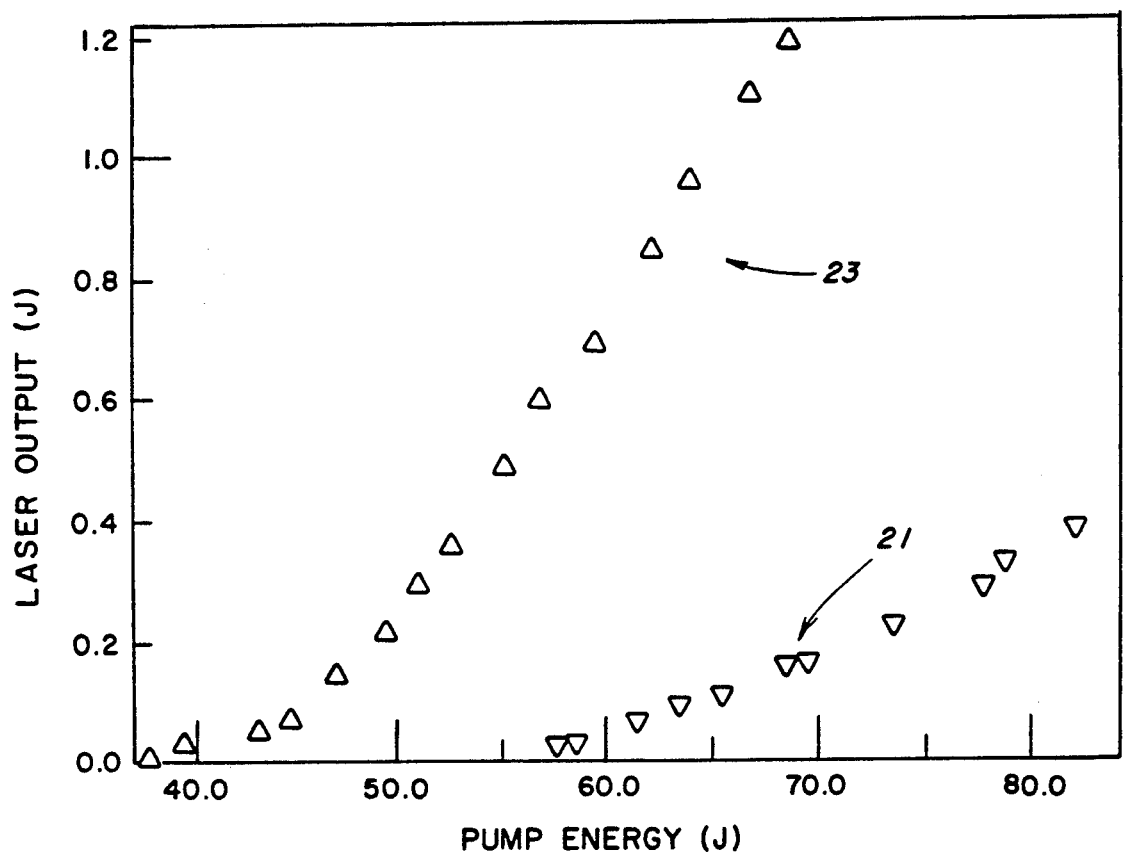
FIG. 3 illustrates the dramatic improvement in the slope efficiency, or performance, of the laser of FIG. 1, resulting from the optimization of dopant concentrations and cavity design.

FIG. 3 illustrates the dramatic effect that the optimization of ion concentrations, particularly the $Cr^{3+}$ ion concentration, has on the laser slope efficiency (or laser performance) at 2.09 microns. Laser slope efficiency data is shown for two different dopant compositions in a YAG host material of the laser rod 13 of FIG. 1. Laser performance curve 21 illustrates a slope efficiency of about 1.4% that was measured when the YAG host material of the laser rod 13 was doped with 2.5% $Cr^{3+}$, 6% $Tm^{3+}$ and 0.36% $Ho^{3+}$. Laser performance curve 23 illustrates a slope efficiency of about 5.1% that was measured when the YAG host material of the laser rod 13 was doped with 0.6% $Cr^{3+}$, 6% $Tm^{3+}$ and 0.36% $Ho^{3+}$. Thus, the curves 21 and 23 demonstrate that a low $Cr^{3+}$ concentration of 0.6% in the YAG host material provides an optimum doping level for achieving a high slope efficiency.

To achieve the measured high slope efficiency of 5.1% at 2.09 microns, the applicants utilized the most preferred concentrations or amounts of dopants in the YAG laser rod 13, as more fully discussed below.

Within the YAG laser rod 13, a $Cr^{3+}$ ion concentration of $5.6$ times $10^{19}$ cm$^{-3}$ (which is about a 0.6% concentration of $Cr^{3+}$ sensitizer ions, as defined above), a $Tm^{3+}$ concentration of $8.3$ times $10^{20}$ cm$^{-3}$ (which is about a 6.0% concentration of $Tm^{3+}$ sensitizer ions, as defined above), and a $Ho^{3+}$ ion concentration of 5 times $10^{19}$ cm$^{-3}$ (which is about a 0.36% concentration of $Ho^{3+}$ activator ions, as defined above) were chosen.

The $Cr^{3+}$ ion concentration of $5.6$ times $10^{19}$ cm$^{-3}$ (or 0.6% concentration) was chosen in order to provide an optimized balance between the efficient absorption of the flashlamp light in the laser rod 13 and uniform pumping of the mode volume in the 5 mm diameter YAG laser rod 13. Again, FIG. 3 highlights the need to carefully choose the $Cr^{3+}$ copant concentration for the optimization of the performance and slope efficiency of the laser 11 of FIG. 1.

The $Tm^{3+}$ ion concentration of $8.3$ times $10^{20}$ cm$^{-3}$ (or 6.0% concentration) was chosen to favor both the $Cr^{3+}$ to $Tm^{3+}$ energy transfer and the $Tm^{3+}$ cross relaxation processes. Previous work had shown that the $Cr^{3+}$ to $Tm^{3+}$ energy transfer was most efficient in a YAG host material, and that it occurs almost exclusively by a direct dipole-dipole interaction. The $Cr^{3+}$ to $Tm^{3+}$ transfer efficiency in the Cr:Tm:Ho:YAG material in the laser rod 13, as was used in the laser performance curve 23 in FIG. 3, was determined by measuring the $Cr^{3+}$ fluorescence following a pulsed laser excitation and was found to be 97.5%. This $Cr^{3+}$ to $Tm^{3+}$ transfer efficiency of 97.5% resulted from a Tm:Cr doping ratio of 10:1 for the most preferred concentrations of $Cr^{3+}$ and $Tm^{3+}$.

The $Ho^{3+}$ concentration was chosen so that efficient energy transfer occurred from the $Tm^{3+}$ ions to the $Ho^{3+}$ ions and, in addition, so tat loss due to the ground state absorption in the $Ho^{3+}$ ions was not deleterious to the operation of the laser 11. Highest slope efficiency, or optimized laser performance, resulted when the ratio of the $Tm^{3+}$ ions to the $Ho^{3+}$ ions was about 16:1.

Thus, in the specific test result described in relation to FIG. 3 to obtain a 5.1% slope efficiency at 2.09 microns, once an optimum $Cr^{3+}$ concentration of 0.6% was selected, the 10:1 Tm:Cr ratio was utilized to select a 6% concentration of $Tm^{3+}$, and the 16:1 Tm:Ho ratio was essentially utilized to select a 0.36% concentration of $Ho^{3+}$.

The doped laser rod 13 was pumped by a single simmered Xe flashlamp 19 having a 63.5 mm arc length, filled to 630 Torr, with a 4 mm bore diameter. The flashlamp 19 was pulsed at a pulse repetition frequency of one hertz (1 Hz) to obtain the output laser emission at substantially 2.09 microns.

As stated before, tests have shown that the probability of the $Tm^{3+}$ cross-relaxation was negligible for $Tm^{3+}$ concentrations less than about 2%, but approaches unity for $Tm^{3+}$ concentrations greater than about 5%. The 6% $Tm^{3+}$ used in this description takes full advantage of the $Tm^{3+}$ cross-relaxation process.

Therefore, what has been described in a preferred embodiment of the invention is a room-temperature, flashpumped, solid state laser for producing a laser emission at a wavelength of substantially 2.09 microns with a slope efficiency of at least 4%, but preferrably of at least 5%.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A room temperature solid state laser comprising:
   a laser cavity defined by first and second reflective elements opposing each other on a common axis to form a reflective path therebetween;
   a laser crystal disposed in said laser cavity, said laser crystal having a host material capable of accepting $Cr^{3+}$ sensitizer ions, $Tm^{3+}$ sensitizer ions and $Ho^{3+}$ activator ions, an amount of $Cr^{3+}$ sensitizer ions between about 0.3% and about 2% dispersed within said host material, an amount of $Tm^{3+}$ sensitizer ions between about 3% and about 12% dispersed within said host material, and an amount of $Ho^{3+}$ activator ions between about 0.1% and about 0.7% dispersed within said host material; and
   flashlamp means for exciting said laser crystal to produce a laser emission at substantially 2.09 microns; and
   a predetermined one of said first and second reflective elements outputting a portion of said laser emission at substantially 2.09 microns when said laser crystal is excited by said flashlamp means.

2. The laser of claim 1 wherein:
said host material is selected from the group consisting of YAG, YAlO, YGG, YSAG, YSGG, GGG, GSAG, GSGG, and LLGG.

3. The laser of claim 1 wherein:
said host material is selected from the group consisting of YAG, YSAG and YSGG.

4. The laser of claim 3 wherein:
said host material is doped with an amount of $Cr^{3+}$ sensitizer ions between about 0.3% and about 1.3%, with an amount of $Tm^{3+}$ sensitizer ions between about 4.5% and about 7.5%, and with an amount of $Ho^{3+}$ activator ions between about 0.25% and about 0.5%.

5. The laser of claim 1 wherein:
said host material is YAG.

6. The laser of claim 5 wherein:
said host material is doped with an amount of $Cr^{3+}$ sensitizer ions between about 0.4% and about 0.9%, with an amount of $Tm^{3+}$ sensitizer ions between about 5% and about 6%, and with an amount of $Ho^{3+}$ activator ions between about 0.25% and about 0.5%.

7. The laser of claim 1 wherein:
said flashlamp means is a pulsed flashlamp for applying pulses of light to said laser crystal.

8. The laser of claim 1 wherein:
said flashlamp means is a xenon flashlamp.

9. The laser of claim 1 wherein:
said $Cr^{3+}$, $Tm^{3+}$ and $Ho^{3+}$ doped laser crystal is responsive to light from said flashlamp means for absorbing that light in the $^4T_1$ and $^4T_2$ levels of said $Cr^{3+}$ sensitizer ions, resulting in a nonradiative transfer of the excitation from the thermally mixed $^4T_2/^2E$ levels of said $Cr^{3+}$ sensitizer ions to the $^3F_3$ level of said $Tm^{3+}$ sensitizer ions and a cross-relaxation among said $Tm^{3+}$ sensitizer ions to the $^3F_4$ level, a transfer of energy from the $^3F_4$ level of said $Tm^{3+}$ sensitizer ions to populate the $^5I_7$ upper laser level of said $Ho^{3+}$ activator ions to enable said laser crystal to lase at the laser transition from the $^5I_7$ level to the $^5I_8$ level of said $Ho^{3+}$ activator ions to produce said laser emission at substantially 2.09 microns.

10. The laser of claim 1 wherein:
said laser crystal is substantially in the form of a cylindrical laser rod whose long dimension is along the cylinder axis; and
said flashlamp means is a flashlamp having a long dimension along a first axis which is substantially parallel to said cylinder axis of said cylindrical laser rod for enabling said $Cr^{3+}$ sensitizer ions in said cylindrical laser rod to absorb light from said flashlamp along the long dimension of said laser rod.

11. The laser of claim 10 wherein:
said host material in said laser rod is selected from the group consisting of YAG, YSAG and YSGG.

12. The laser of claim 11 wherein:
said host material is doped with an amount of $Cr^{3+}$ sensitizer ions between about 0.3% and about 1.3%, with an amount of $Tm^{3+}$ sensitizer ions between about 4.5% and about 7.5%, and with an amount of $Ho^{3+}$ activator ions between about 0.25% and about 0.5%.

13. The laser of claim 10 wherein:
said host material in said laser rod is YAG.

14. The laser of claim 13 wherein:
said YAG host material is doped with an amount of $Cr^{3+}$ sensitizer ions between about 0.4% and about 0.9%, with an amount of $Tm^{3+}$ sensitizer ions between about 5% and about 6%, and with an amount of $Ho^{3+}$ activator ions between about 0.25% and about 0.5%.

* * * * *